(12) United States Patent
Moretto

(10) Patent No.: US 7,188,434 B2
(45) Date of Patent: Mar. 13, 2007

(54) MOLECULAR FILTER DEHUMIDIFICATION APPARATUS AND PLANT

(75) Inventor: Renato Moretto, Massanzago-Padova (IT)

(73) Assignee: Moretto S.P.A., Massanzago-Padova (IT)

(*) Notice: Subject to any disclaimer, the term of this patent is extended or adjusted under 35 U.S.C. 154(b) by 242 days.

(21) Appl. No.: 10/832,455

(22) Filed: Apr. 27, 2004

(65) Prior Publication Data

US 2004/0231187 A1 Nov. 25, 2004

(30) Foreign Application Priority Data

May 5, 2003 (IT) .......................... VR2003A0053

(51) Int. Cl.
*F26B 21/06* (2006.01)

(52) U.S. Cl. ................... 34/80; 34/82; 34/565; 34/566; 34/570; 392/487; 392/489; 392/492

(58) Field of Classification Search ................. 34/330, 34/472, 473, 489, 80, 79, 82, 565, 566, 570; 432/178, 179, 180, 30; 392/485, 487, 488, 392/489, 491, 492; 62/271, 272, 93, 94, 62/238.1–238.3
See application file for complete search history.

(56) References Cited

U.S. PATENT DOCUMENTS 2,861,873 A * 11/1958 Worn .......................... 392/492
3,621,585 A    11/1971 Robertson 4,413,426 A    11/1983 Graff
5,182,871 A     2/1993 Karls

FOREIGN PATENT DOCUMENTS

| DE | 4234696  | 5/1993  |
|----|----------|---------|
| FR | 2.224.269| 10/1974 |
| IT | 01263362 | 8/1996  |

* cited by examiner

*Primary Examiner*—Jiping Lu
(74) *Attorney, Agent, or Firm*—Nixon & Vanderhye P.C.

(57) ABSTRACT

A dehumidification apparatus including an outer tubular container (2) closed at its ends, a first (5) and a second (9) transverse grids located inside the tubular container (2), one grid element being spaced from the other and from a respective adjacent end of the tubular container (2) and delimiting a receiving space therewith, a mass of molecular sieves (MS) located in the receiving space, heating elements (19) in the tubular container (2), and first and second openings (4, 16) for communication of the interior of the container with the outside, characterised in that it comprises an inner tubular jacket (6) extending from at least the first grid (5) for a distance greater than that between the first (5) and the second (9) grid, thereby shaping the receiving space for the sieves (8) as an annular gap and providing a projecting section (6*a*) extending from the second grid (9); and an annular partition (17) between the outer container (2) and the inner jacket (6) at the projecting section (6*a*) of the inner jacket (6), thereby delimiting an annular manifold space (7) with the second grid element (9) communicating with the outside through the first opening (4), and an end space (7*a*) adjacent to the second end of the external container (2) communicating with the interior (18) of the inner jacket (6) and with the outside through the second opening (16).

25 Claims, 8 Drawing Sheets

US 7,188,434 B2

MOLECULAR FILTER DEHUMIDIFICATION APPARATUS AND PLANT

FIELD OF THE INVENTION

The present invention regards a molecular filter dehumidification apparatus and plant.

BACKGROUND OF THE INVENTION

As is known in the transformation of plastic materials, a very important treatment is the process of dehumidification of the plastic material granules, in other words the removal of the water contained in the granules of so-called hygroscopic plastics.

The elimination of the humidity content of the granules is necessary because during the high temperature fusion of the material the water penetrates into the molecular chain of the polymer granulate and breaks it, which results in a reduction of mechanical performance and generates bubbles, pitting and uneven colouring of the product.

Traditional equipment for dehumidifying or separating and eliminating the water from the plastic granules are commonly known as dehumidifiers. In the majority of cases, a dehumidifier is a machine employing the principle of molecular filters. In practice, molecular filters constitute the principle component of the machine, which exploits their capacity for almost total adsorption at room temperature of the humidity of the air.

The dehumidified and thus dry air is then heated and passed through the granular material in a treatment container employing molecular filters. The granular material gradually yields up its humidity to the dry air passing through it. The duration of the process depends on the residual humidity of the material, and the temperature and flow of dry air.

The adsorption capacity of the filters is however quantitatively limited and after a certain time saturation is reached. At this point, the dehumidification process is interrupted and may be made to continue using a second container of filters, while the saturated filter container undergoes regeneration.

The majority of dehumidification plants therefore requires two containers of molecular filters operating in alternation.

Two kinds of filter containers are known, as shown in FIGS. 1 and 2.

FIG. 1 shows a filter container or tower C of cartridge type. In this configuration the air enters via a lower pipe I driven by a blower or compressor (not shown) and passes across an electrical resistance R which is inactive during process. The air then passes through a lower limiting grid GI beyond which it comes into contact with the mass of molecular filters MS.

Molecular filters capture and retain water molecules contained in the air being processed which thus becomes dried and after passing through the mass of filters MS crosses an upper limiting grid GS and enters an upper pipe S to be conveyed to a hopper (not shown) containing plastic granular material to be treated. The dried air flows through the granular material and is then recycled through the process.

In this process molecular filters MS of the first layer, i.e. the lowest filters first to be met by the incoming air, become quickly saturated so that humidity adsorption function is gradually taken over by the next following upper layer. When also this layer becomes saturated humidity adsorption takes place in the next following higher layer and so on, until the entire cartridge is saturated, as shown in FIG. 1*a*.

The time required to reach saturation can be generally estimated as a function of the humidity adsorption capacity of the filters and the quantity of water to be eliminated, with an additional charge factor of about 30% to take into account local climatic conditions. Once the preset saturation time for the mass of filters MS has elapsed, the saturated filters are regenerated, i.e. they are subjected to a water removing process to be restored to their initial condition. To this end, controlled electrical resistance R is energized to heat the regeneration air from the lower pipe I to the temperature of about 300° C. required to break the electromagnetic bond binding the water molecules to the filter structure. Freed water molecules are removed by the regeneration air flowing from the bottom to the top of the device.

As noted above, the tower or container C is never completely saturated, and thus the water, before being removed through the top of the structure, is captured by the upper layers of filters which have not been saturated during processing phase until the same are heated to a sufficient extent by the flow of hot air flowing through them, thereby releasing any water molecules held in them. The phenomenon is repeated and gradually moved upwards until the entire mass of filters MS below the upper limiting grid GS in the tower C has been regenerated.

FIG. 2 diagrammatically shows a hollow cartridge tower CC. In order to exploit more uniformly the mass of filters MS in the tower, the an axial pipe TF extending through the filters is provided, which comprises a perforated grid to distribute air uniformly within the cartridge CC in both the lower and upper layers of the filter mass MS. The attainable results are slightly better than those achievable with the configuration of FIG. 1, the direction, course and changes in the air flows.

Clearly, in order to regenerate conventional filter cartridges or towers a considerable amount of energy and time are required. Most of the energy consumption in such towers is due to production of the heat required for regenerating the sieves. A serious operating problem of conventional dehumidifiers is the fact that such configurations are "orthogonal", i.e. air is always conveyed along preferential routes in the sieves mass MS caused by the dynamics of the fluid in the tower. This means that it is impossible to exploit entirely the totality of the molecular sieve mass and hence one does not take full advantage of the potential of the tower, although one consumes a greater amount of energy than necessary, which considerably reduces the efficiency as a whole.

SUMMARY OF THE INVENTION

The main object of the present invention is to provide a molecular sieve dehumidification device and a plant of a new conception suitable for eliminating or considerably reducing the above mentioned limitations to be found with the dehumidification towers known in the state of the art.

Another object of the present invention is to provide a safe and efficient molecular sieve dehumidification device and plant suitable for providing a high efficiency operation.

A further object of the present invention is to provide a molecular filter dehumidification device and plant which is relatively simple to manufacture and install so as to be advantageous also from the economical point of view.

According to a first aspect of the present invention there is provided a dehumidification apparatus including an outer tubular container closed at its ends, first and second transverse grid elements located inside said tubular container, one grid element being spaced from the other and from a respective adjacent end of said tubular container and delimiting a receiving space therewith, a mass of molecular sieves located in said receiving space, heating elements in said tubular container, and a first and a second openings for communication of the interior of said container with the outside, characterised in that it comprises an inner tubular jacket extending from at least said first grid element for a distance greater than that between said first and said second grid element, thereby shaping said receiving space for said mass sieves as an annular gap and providing a projecting section extending from said second grid element; and an annular partition between said outer container and said inner jacket at said projecting section of said inner jacket, thereby delimiting an annular manifold space with said second grid element communicating with the outside through said first opening, and an end space adjacent to said second end of said outer container communicating with the interior of said inner jacket and with the outside through said second opening.

According to another aspect, the present invention there is provided a dehumidification plant for granular material, the plant including at least one treatment silo container for said granular material having one air outlet end communicating with an intake of at least one blower and its other air intake end communicating with a dehumidified air outlet of at least one molecular sieve dehumidification apparatus referred to above and at least one deviation valve between delivery of said at least one blower and said at least one dehumidification device.

BRIEF DESCRIPTION OF THE DRAWINGS

Further aspects and advantages of the present invention will appear more clearly from the following detailed description of a number of currently preferred embodiments, given by way of non limiting examples in FIGS. 3 to 8 of the accompanying drawings, in which:

In FIGS. 3 to 8 of the accompanying drawings, similar parts or components have been identified with the same reference numerals.

DESCRIPTION OF THE PREFERRED EMBODIMENTS

Figure 3:
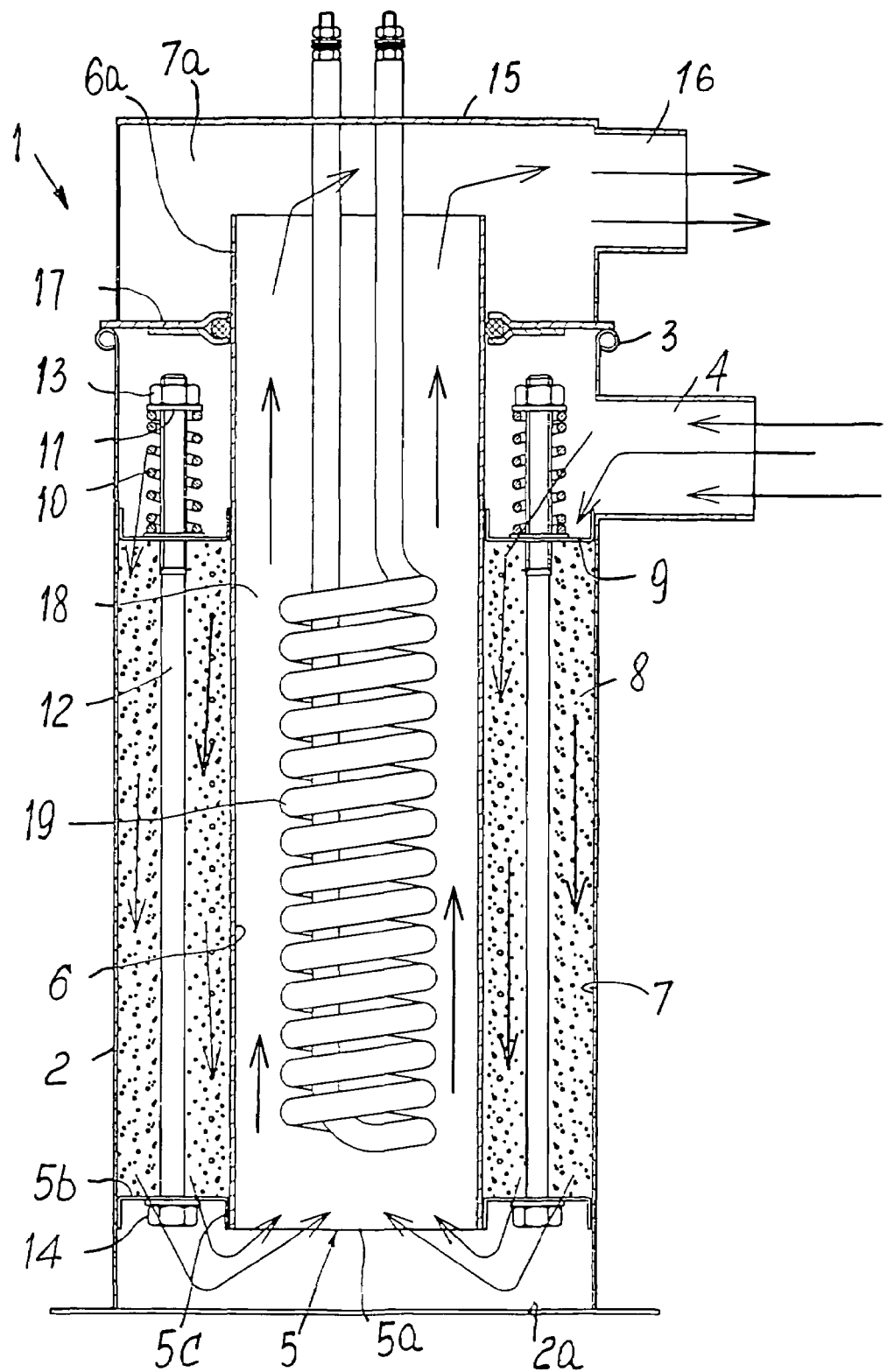
FIG. 3 illustrates a longitudinal diametrical section view of a sieve dehumidification tower during a processing or air dehumidification phase according to a first embodiment of the present invention.

With reference first to FIG. 3, it will be seen that a dehumidification tower 1 according to the present invention comprises an outer container or jacket 2 having a bottom 2a, preferably cylindrical in shape and made of stainless steel. In the vicinity of its upper end 3 which is preferably curled as will be further explained below, the outer jacket or container 2 is equipped with an air intake/outlet opening or duct 4, as explained below.

At a short distance from the bottom 2a within the container 2 there is fixed, preferably by welding, a first or lower grid 5, which extends at two different levels, i.e. it has a central portion 5a substantially parallel to the bottom 2a and a peripheral (circular) crown portion 5b higher than the central portion 5a so as to delimit an inner vertical axial shoulder 5c.

An inner tubular metal sleeve 6, preferably made of stainless steel, is inserted into shoulder 5c, and extends in the longitudinal axial direction. Between outer container or jacket 2 and inner jacket 6 an annular gap 7 is delimited, in which a mass of molecular sieves or filters 8 is located. The mass of molecular sieves 8 is maintained compressed by an upper annular grid 9, which extends throughout the surface area of the annular gap 7 and is slidably mounted between the inner and the outer jackets 6 and 2, respectively.

The mobile grid 9 is also resiliently loaded by a plurality of helical springs 10 arranged angularly spaced from each other along the upper grid 9 and each having one end thereof resting against the grid 9 and its other end reacting against a respective washer 11 fitted onto one threaded end of a respective tie-rod 12 and abutting against a setting nut 13. The other end of each tie-rod 12 extends out from section 5b of the lower grid 5 and is equipped with a head or abutment nut 14. With such a structure, on the one hand by acting on nuts 13 it is possible to control the degree of compression of the mass of molecular sieves 8, while on the other any variation in the volume of the sieve mass 8 is automatically compensated during operation of the apparatus 1.

The outer container or jacket 2 supports at its top a cap 15 with a securing flange 15a, extends above and at a distance from the inner jacket 6, and is formed with an opening or duct for air intake/outlet 16. Between cap 15 and the upper end 3 of the outer container 2 a sealing device 17 is provided which is shaped as an annular partition as further described with reference to FIG. 5 and delimits an inner space 7a with cap 15.

The inner tubular jacket 6 extends, in turn, with its end section 6a beyond the upper grid 9 and the upper edge 3 of the outer container 2 so as to reach and communicate with the internal space 7a. Inside the internal tubular jacket 6 an axial light or space 18 is delimited, in which a heat source or heating device is fitted, preferentially comprising one or more electrical resistors 19, e.g. supported and held in position by cap 15, through which they extend to be connected to a suitable electrical power source in any suitable manner.

With a dehumidification tower 1 structured as described above, it is possible to eliminate the problem of formation of preferential routes within the mass of molecular sieves 8 as a flow of air is caused in the tower which is uniformly distributed in the axial direction of the cartridge of molecular sieves.

As a matter of fact, during an air dehumidification phase, also called a processing phase, air is taken in via pipe 4, is uniformly distributed throughout the gap 7 above the mobile upper grid 9 and then flows through the compression grid 9 loaded by the springs 10. The air flow is thus uniformly distributed among the mass of sieves 8 and exits from section 5b to enter the space 18 in the inner jacket 6 where the resistor 19 is located. Resistor 19 heats the air flowing through the space 18 and discharged through the exhaust pipe 16 provided in the cap 14 to a temperature suitable for the type of plastics material to be dried. From opening or pipe 16 the heated air is forwarded to a plastics material treatment hopper (not shown).

Figure 4:
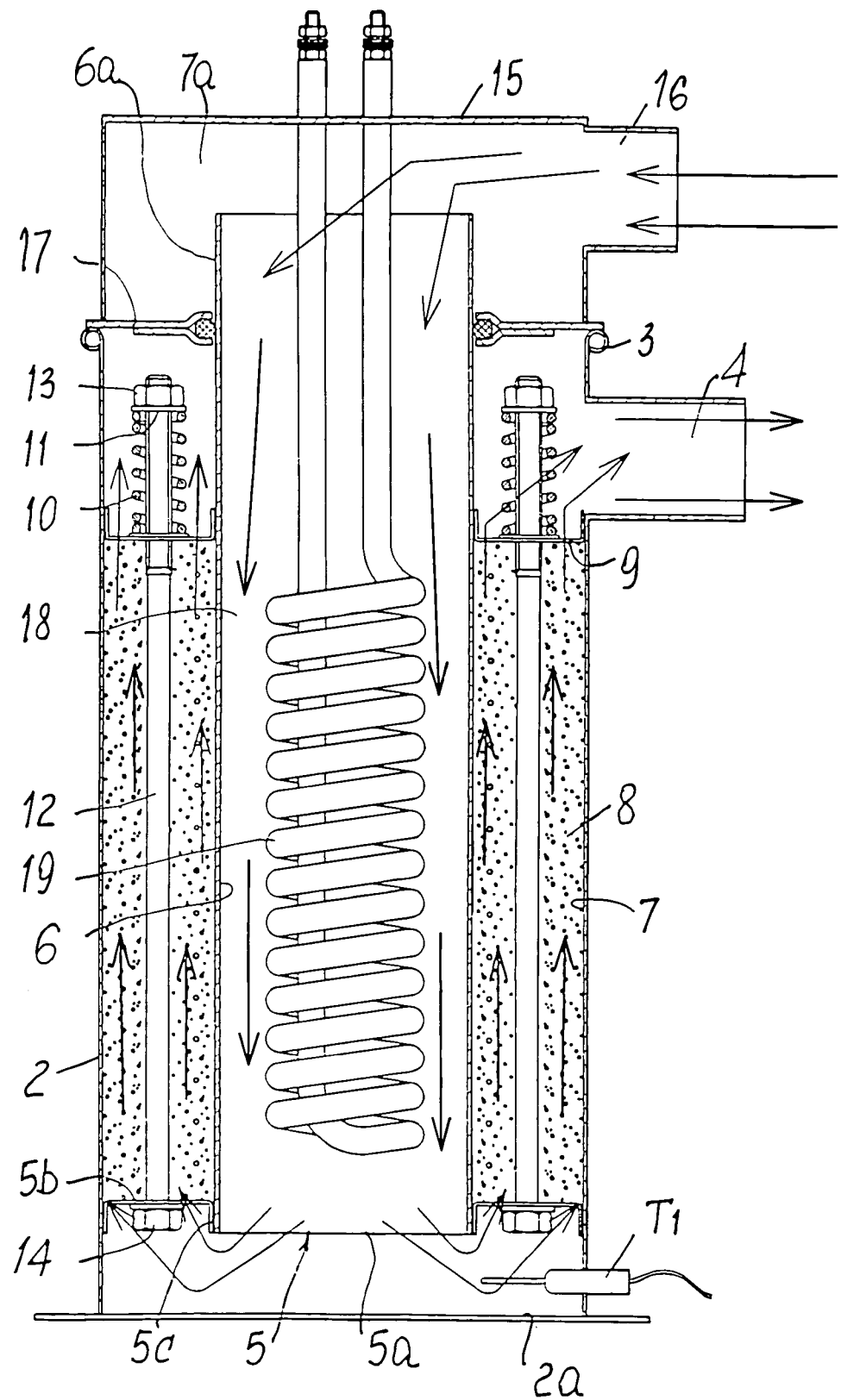
FIG. 4 is a view similar to that of FIG. 3, illustrating a molecular sieve dehumidification phase.

Once the mass of sieves 8 has reached saturation, they must be regenerated, as shown in FIG. 4. Through suitable shunting pipes outside the tower 1, as further illustrated below, the air flow is reversed by setting the opening or pipe 4 into communication with an exhaust duct and blowing air into pipe 16. The electrical resistor 19 is energized again, but this time it is controlled by a temperature sensor T1 located between the bottom of the container 2 and the lower grid 5, so that air flowing through the space 18 is heated by the resistor 19 and reaches a temperature of approximately 300° C. at the bottom of the container 2.

Air thus heated then flows through the annular section 5b of the lower grid 5 and rises again through the mass of molecular sieves 8, thereby heating them starting from the bottom to the top before being discharged loaded with humidity through the upper annular grid 9. The humid air collected in the space above the grid 9 is evacuated into the atmosphere via pipe 4.

With this specific configuration, which provided for the air being heated in an area, i.e. duct or space 18, that is surrounded by the mass of sieves 8, heat irradiated by the resistance is also partly absorbed by the metal wall of the inner jacket 6, which transmits it by conduction to the mass of molecular sieves 8 contained in it. In this way, most of the heat emitted by the resistor 19 is exploited for heating the sieves 8, at least those in the vicinity of the inner jacket 6 containing them.

Moreover, the provision of the metal sealing device 17 which also acts as a partition located in direct contact with both the intake and outlet air flows makes it possible to obtain an efficient heat exchanger whose potential can vary and depends on its configuration. More specifically, the metal sealing device 17 has the advantage of transmitting heat and thus preheating air and vapours coming in through pipe 16 and at the same time cooling the vapours being discharged via pipe 4, which results in saving regeneration energy.

It will be noted that the flows in the processing and regeneration phases are inverted, i.e. regeneration takes place from below upwards while the processing phase takes place from above downwards. Thus, most humidity contained in the air is captured starting from the upper portion of the molecular sieves 8 in the processing phase (FIG. 3), so that the water content in the air decreases towards the bottom of the tower. During the regeneration phase (FIG. 4), instead, owing to the fact that the air flow has been reversed, hot and dry air first meet the layers of molecular sieves 8 containing a lower amount of adsorbed water, which water content is rapidly taken away, and subsequently the layers of sieves containing a higher water content. In this way, any water in the sieves is eliminated in a much shorter time than with conventional methods.

Figures 1, 1A:
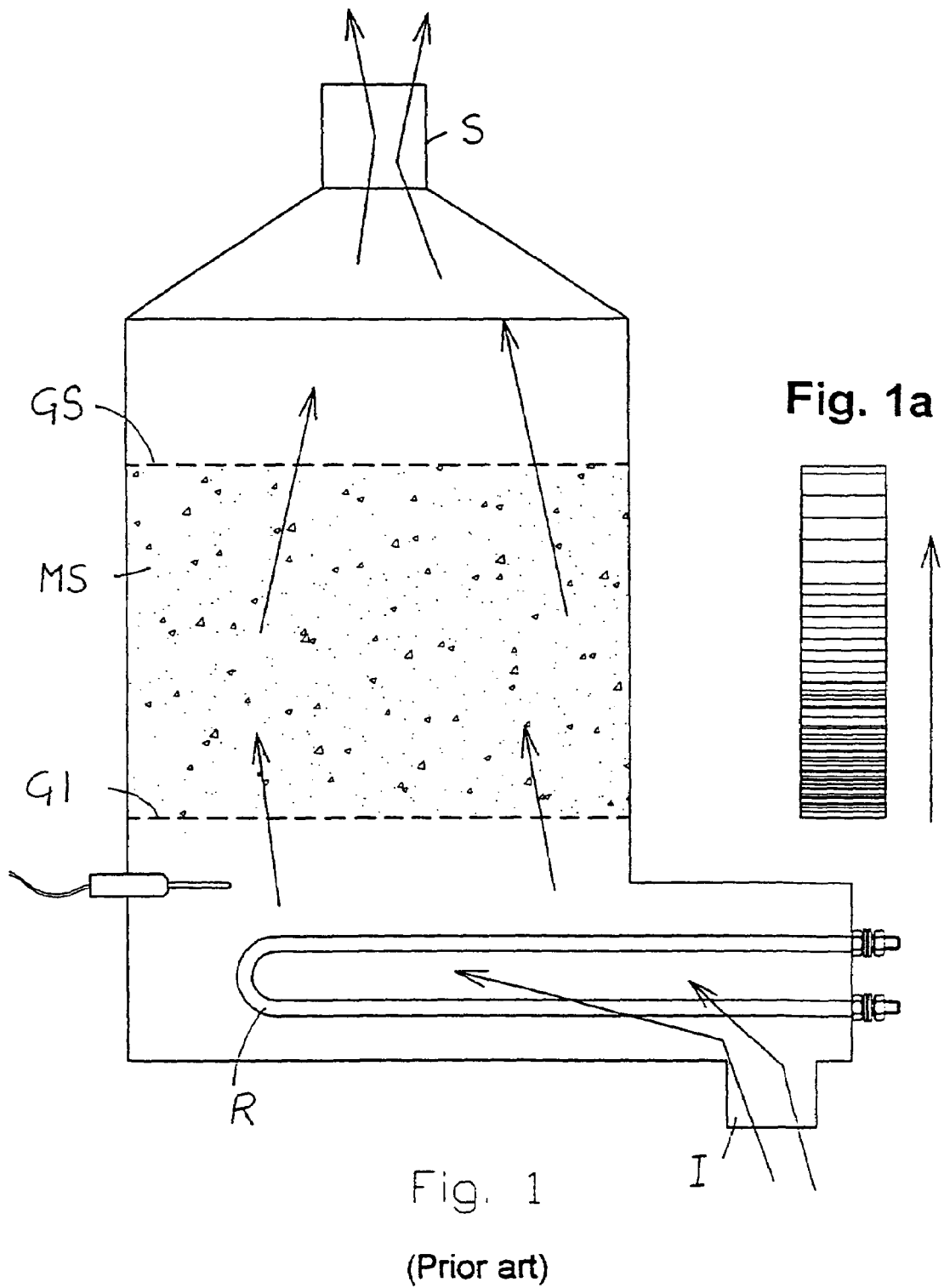
FIG. 1 is a schematic sectional view taken along a vertical plane of a filter dehumidification container or tower employing conventional cartridge filters.
FIG. 1a shows a diagram of saturation level of the mass of filters in the dehumidification tower shown in FIG. 1.
Figure 2:
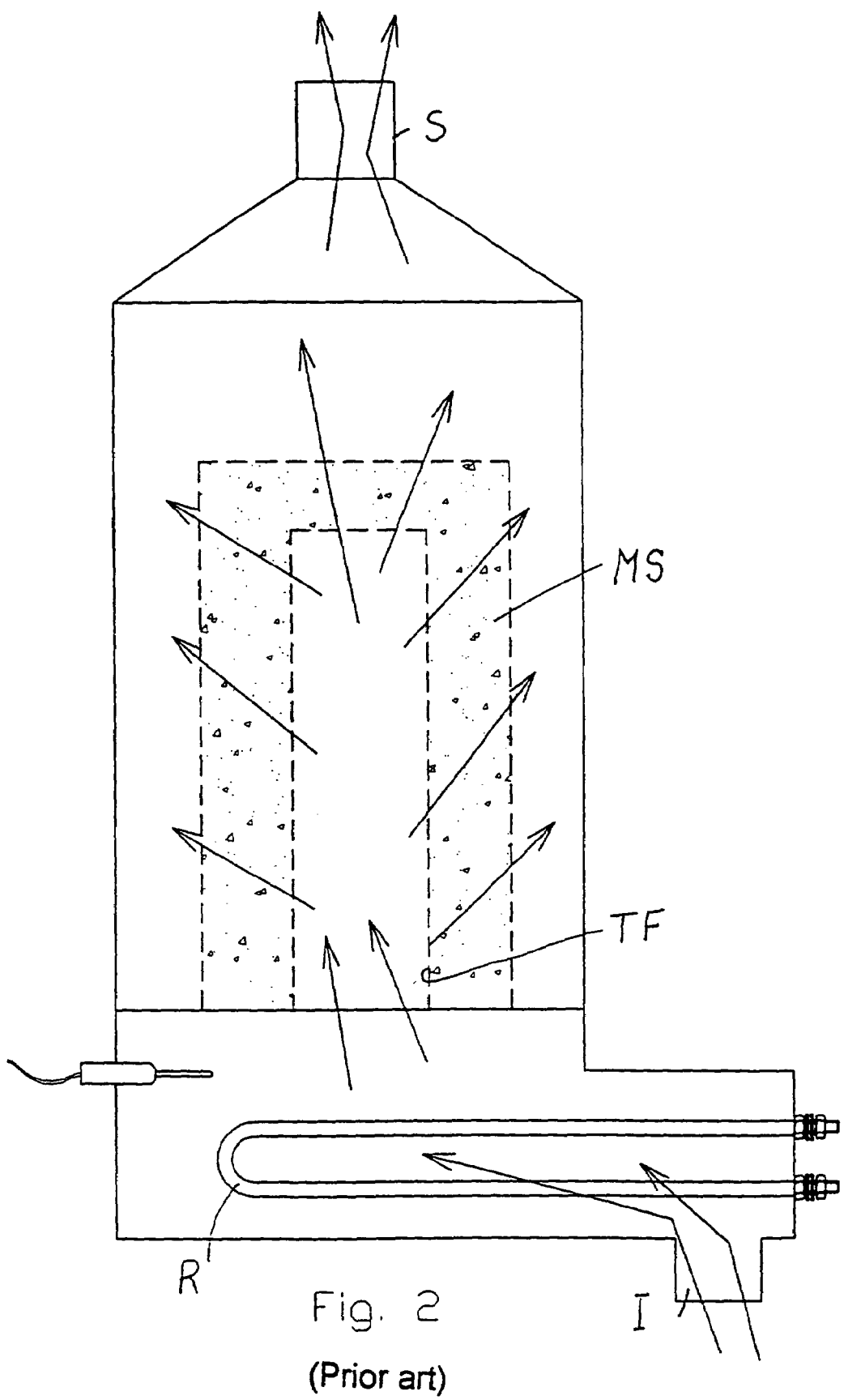
FIG. 2 is a diagrammatic section view taken along a vertical plane of a sieve dehumidification tower of conventional hollow cartridge type.

Practical tests have shown that, compared with conventional solutions illustrated in FIGS. 1 and 2, with an apparatus according to the present invention the efficiency of the sieves 8 in the processing phase is considerably higher, and the time required for the regeneration phase is substantially reduced at the same time.

One especially advantageous characteristic of the regeneration tower 1 is undoubtedly due to its structure with co-axial components, which does not give rise to preferential air routes and maintains a constant efficiency.

To obtain such a particularly simple co-axial construction, the delivery and return streams are kept separated, a compartmenting that must be air tight both between both the delivery and return streams and inside and outside of the tower 1 even at the relatively high processing temperatures. Such a construction must also allow components to be disassembled whenever required.

Figure 5:
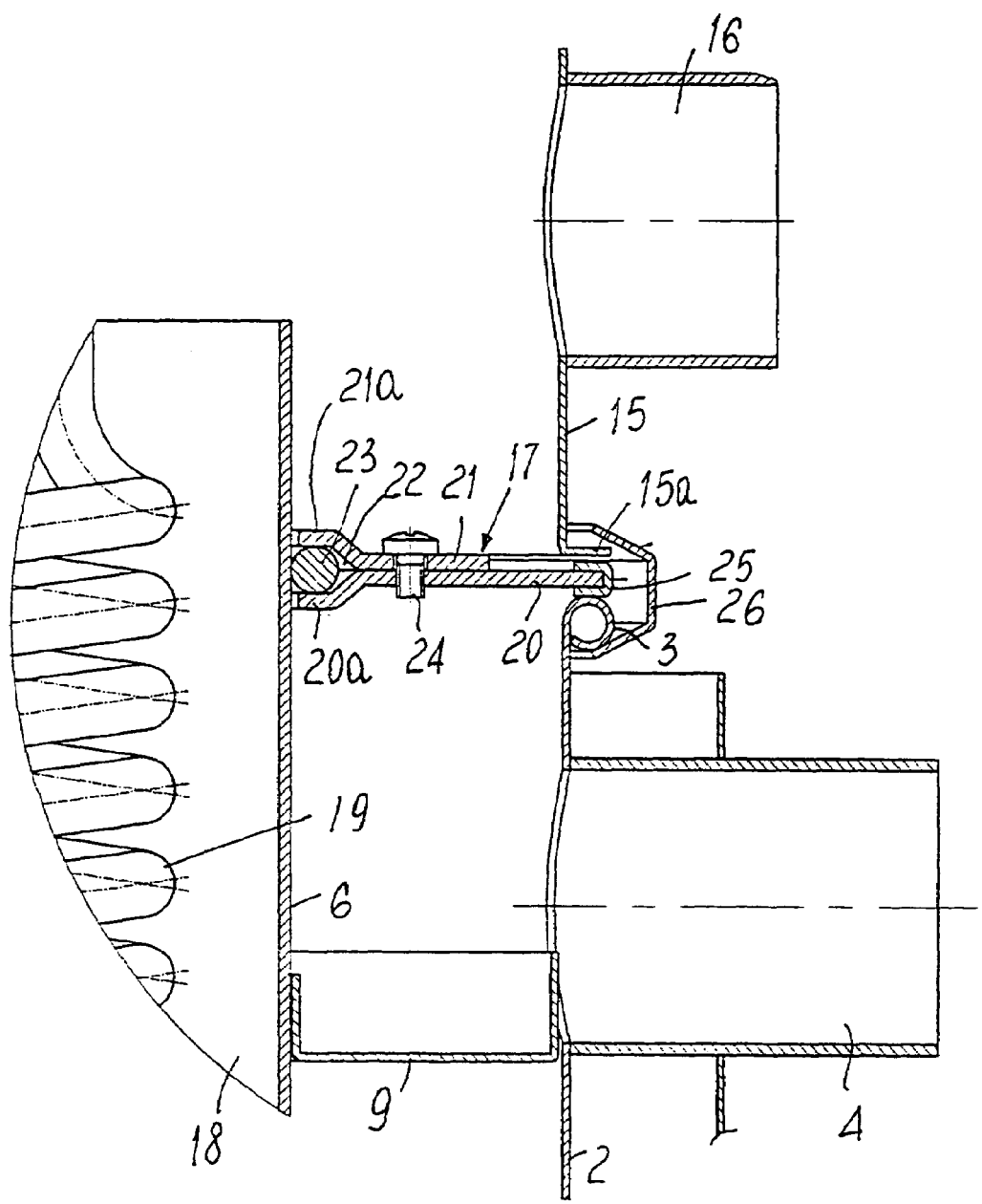
FIG. 5 shows a detail in section and on an enlarged scale of the dehumidification tower in FIGS. 3 and 4.

This has been achieved according to the present invention by means of the sealing device 17 illustrated in detail in FIG. 5. Such device is located between the upper edge 3, which is preferably curled, of the outer container 1 and the lower edge 15a, preferably outwardly flanged, of the cap 15, i.e. between the delivery/return ducts 4 and 16.

Sealing device 17 comprises a annular flanged plate-like element 20 having a flared rim 20a, which delimits the internal light of the flanged plate-like element, and extends, in use, downwards, and an annular counter-flanged plate-like element 21 having a reduced width respect to flange 20 and a flared rim 21a, which delimits the inner light of the counter-flanged element, and extends upwards, in use. Thus, once the counter-flange 21 has been located on flange 20 with its flared rim extending upwards, it delimits with flange 20 an annular end seat 22 against the inner jacket 6 for receiving a resilient elastic gasket 23 that can withstand temperatures of about 350° C.

Flange 20 and counter-flange 21 can be fixed together by means of any suitable means, e.g. a plurality of angularly spaced screws 24, which while locking together the two flanges compress the gasket 23 and push it towards the inner jacket 6 surrounding the heating element 19 in such a way as to ensure tight sealing between the upper inner space of the container 2 delimited by cap 15 and the inner space delimited by container 2.

The outer rim of the annular flange 20 is surrounded by an annular silicon gasket 25 having a U-shaped profile and being inserted onto flange 20. The gasket 25, in use, is located between the curling of the upper rim 3 of container 2 and the flange 15a of cap 15 to prevent air leaks. The curled rim 3 and flange 15a are tightened together by a surrounding clamp 26 having a channel-shaped cross-section with inclined side walls, e.g. inclined at an angle of 15° to 30°, and equipped with a lever- or screw-locking device designed to press against the sides of the clamp 26 so as to compress together the flange 15a, the silicon gasket 25, the outer rim of flange 20, and the curled rim 3 of container 2, thereby obtaining a tight seal.

Figure 6:
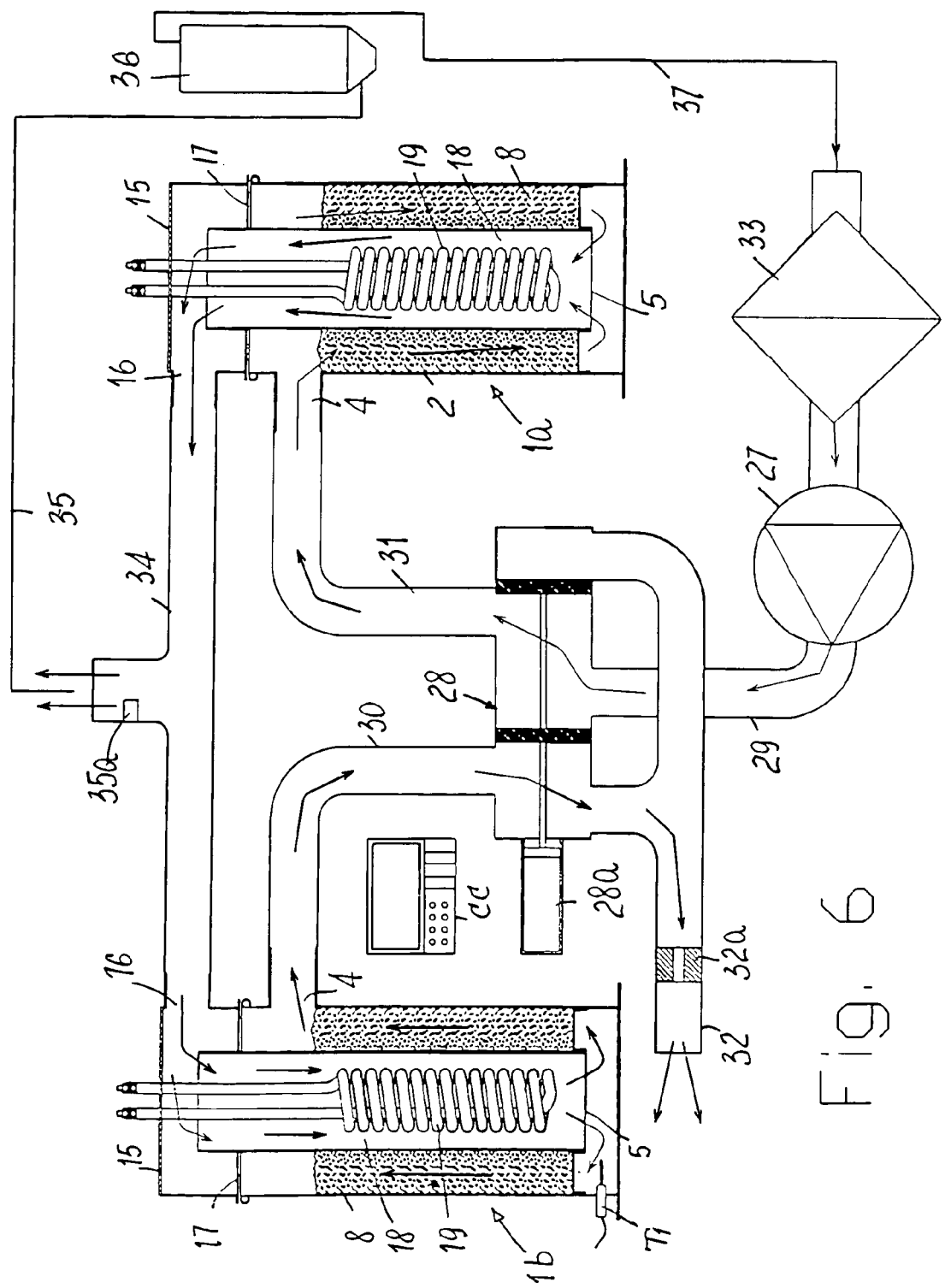
FIG. 6 illustrates a diagrammatic view partly in section of a plant having two molecular sieve dehumidification towers according to the present invention.
Figure 7:
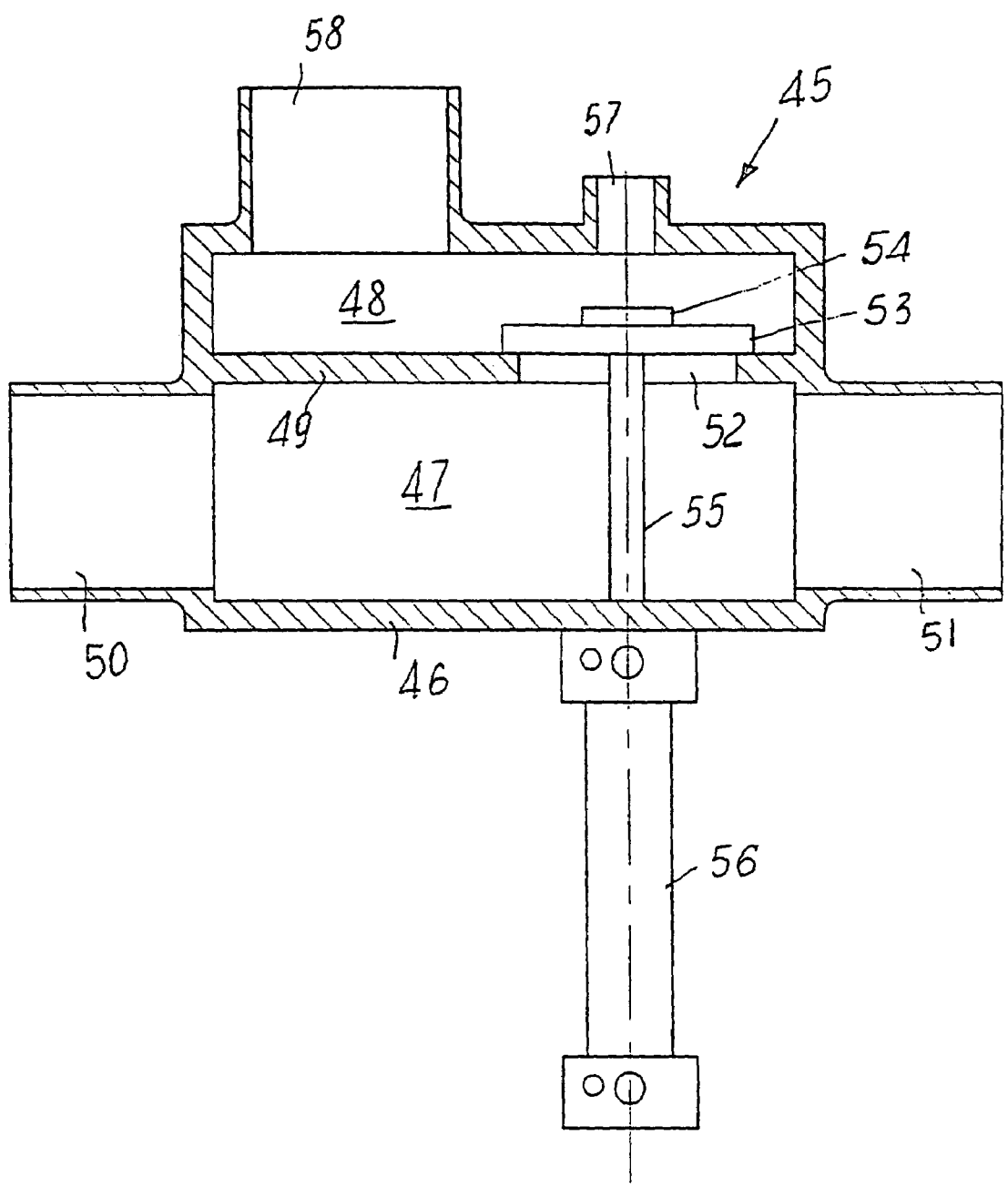
FIG. 7 shows a sectional view of a valve structure suitable for being used in a plant according to the present invention.
Figure 8:
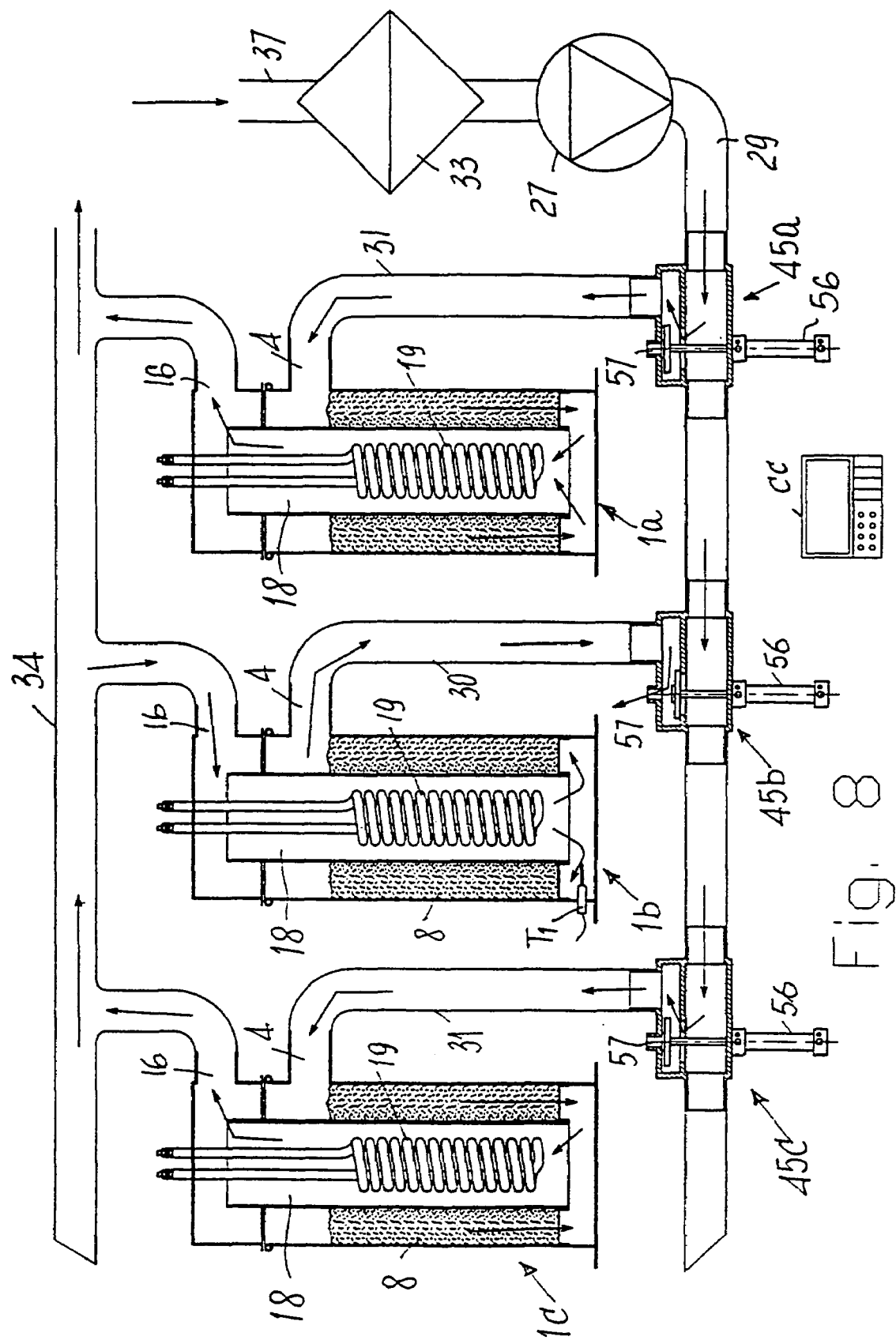
FIG. 8 is a diagrammatic partly sectional view of a plant with more than two sieve dehumidification towers according to the present invention.

A dehumidification tower or apparatus as described above is intended to be part of a dehumidification plant, generally called a "dryer",—see IT-A-1263362 issued to applicant of the present invention—that can include one or several towers, as illustrated in FIGS. 6 to 8.

FIG. 6 shows a plant comprising two molecular sieve towers 1 connected in such a way that, while one tower is dehumidifying processing air and hence the plastic granules, the other is being regenerated. In such a plant configuration, one of the towers is always available to ensure continuity for the dehumidification process of the granular material being treated.

The dehumidification plant according to the present invention, shown in FIG. 6 includes a blower 27, a four way slide valve 28 for reversing the air flow, the valve being fed by a delivery duct 29 on the blower 27 and designed to control the flow through three ducts 30, 31 and 32, respectively, two towers 1a and 1b and a return filter 33. Ducts 30 and 31 communicate with the pipe 4 of towers 1b and 1a, respectively, while duct 32 discharges air into the atmosphere via a preferably adjustable calibrated throttling 32a.

Pipes 16 of the towers 1a and 1b are in communication with one another through a common duct 34 from which an exit duct 35 branches off to convey dry air to one or more treatment hoppers 36 containing granular material to be dehumidified. Humidified air that has crossed the granular material contained in the hopper or hoppers 36 is conveyed via a duct or ducts 37 to the intake of the return filter 33. The dehumidification plant thus operates in a closed circuit.

In the operating situation illustrated in FIG. 6, while in the tower 1a processing air is being dehumidified, in the tower 1b sieves 8 are regenerated. The fan or blower 27 circulates the processing and regeneration air. Pressurised air is delivered to control valve 28 which directs the air flow selectively either to tower 1a or tower 1b. In FIG. 6 the slide valve 28 is shown while diverting the processing air towards tower 1a. Thus, the air enters pipe 4 of the tower and flows downwards through the mass of molecular sieves 8 and removes any water molecules loaded in them. From sieves 8 the air flows through the space 18 and comes into contact with the heating element 19, thus becoming heated before being conveyed into the common duct 34. Most of the heated air is directed towards the outlet 35 connected to the delivery to the hoppers 36.

In hopper delivery pipe 35 a thermoregulation probe 35a is located which controls the power supplied to the electrical resistor 19 which heats the processing air, thereby maintaining the processing air at a constant temperature. The air delivered to the treatment hopper or hoppers 36 then flows through the granular material to be treated and is discharged into return pipe 37 and filtered by filter 33 before being sucked into the suction circuit by the blower 27.

A small part of the air coming from tower 1a and flowing through duct 34 also reaches tower 1b via duct 16 and comes into contact with its electrical resistor 19 controlled by a probe T1 whereby the air is heated to about 300° C. The air at this temperature is fed from below to the sieves 8 to extract water trapped in the sieves and conveyed into the exhaust duct 30 that, via the slide valve 28, communicates with the exhaust duct 32, to be discharged into the atmosphere. The amount of air flowing through tower 1b for regeneration purposes is controlled by the calibrated and preferably adjustable throttling 32a.

This condition is maintained for a preset time until tower 1b is completely regenerated. A cooling phase then starts, which is obtained by switching off resistor 19 to lower the temperature of tower 1b to about 80° C. which is a preferred operating temperature interval.

When the slide valve 28, which is actuated by a hydraulic unit including a piston and cylinder 28a or any other suitable driving means reverses the air flow, the towers commutate their functions and that tower which was previously regenerating its sieves 8, e.g. tower 1b, is now set to perform air dehumidification, whereas tower 1a that was previously effecting air dehumidification is now set to regenerate its sieves 8. As already noted above, the air flow in the processing tower is directed downwards, whereas the air flow in the tower undergoing sieve regeneration moves upwards to promote removal of any water retained in the sieves. Towers 1a and 1b thus operate in cyclically opposite direction. In this way, the regeneration resistors 19 are also employed for heating the processing air, thus the provision of a heating chamber being unnecessary. The air exhausted during the regeneration phase can be replaced by providing an inlet hole in the return filter 35 to balance the whole air circuit.

The entire plant is advantageously programme controlled, e.g. by a programmable controller, generically indicated by CC in FIG. 6

It should also be noted that the regeneration takes place with dry air and thus with a higher water absorption capacity, whereas during air cooling the sieves 8 are not polluted with ambient humidity.

In contrast with sieve regeneration circuits known in the art, no coolers for return pipe 37 are required in order to protect the blower 27 against too high temperatures which could be detrimental for the blower.

The dehumidification plant described above has shown to be a very efficient two-tower molecular sieve dryer, very simple in construction with co-axial structure towers operating with dry regeneration air in reverse flows, and with no heating chamber or coolers.

High performance dryer plants can be obtained by using an extremely simple circuit layout, and more than two independently controlled towers. Such a circuit layout is obtained by employing a valve structure 45 as shown in FIG. 7 to be provided in connection with each tower.

Valve 45 comprises a main valve body 46 having two internal chambers 47 and 48 separated by an internal partition 49. Chamber 47 is in direct communication with two openings or ducts 50 and 51. In the partition 49 an opening 52 is formed which is controlled by a valve or shutter 53. The shutter 53 supports a smaller shutter 54 on its side away from opening 52. The two shutters 53 and 54 are controlled by a common rod 55 that is actuated by a linear actuator, e.g. an air actuated cylinder and piston unit 56.

Shutter 54 is designed to control an opening 57 provided in a side wall of chamber 48 in axial alignment with opening 52. Chamber 48 also has a larger opening 58 arranged laterally to the smaller opening 57. More particularly, opening 52 can be closed by shutter 53 and has a much larger light than opening 57 which is controlled by the smaller shutter 54.

The shunt valve 45 of FIG. 7 is used in a plant such as that shown in FIG. 8, which diagrammatically represents a dryer including more than two towers. In FIG. 8 towers 1a, 1c and 1d are shown as being carrying out an air dehumidification process, whereas in tower 1b sieves are being regenerated.

More particularly, air coming from hopper 36 and filtered at filter 33 is taken in by the fan or blower 27 and delivered under pressure to shunt valves 45a, 45b, 45c, which can be connected together either in series or in parallel.

Valve 45, as described above, comprises two openings 50 and 51 which freely communicate with one another via chamber 47, opening 50 being in communication with the blower delivery duct 29, whereas opening 51 is in communication with opening 50 of the immediately successive valve via a duct 51a, 51b, 51c, respectively, and so on, the last valve 45 having its opening 51 closed. Chamber 47 also has its opening 52 in communication with chamber 48, whose opening 58 communicates with pipe 4 of its respective tower.

Valves 45a, 45c and 45d connected to the processing towers have their shutters 53 raised or in its open position to allow air to flow through it to reach opening 58 for being delivered to pipe 4 in communication with a respective tower, to flow through molecular sieves 8, and reach space 18 to be heated by the respective resistor 19 to a set temperature for the type of granulate to be dried. Outlet 16 of each tower is communication to a manifold 34 having branches 35 which supply an air flow to respective treatment hoppers or silos 36, as shown in FIG. 6.

In the illustrated embodiment tower 1b is the sole being regenerating its sieves. In this case shutter 53 rests on its seat closing the passage 52 and shutter 54 is away from its seat 57 thus placing opening 58 in communication with the atmosphere. When shutter 53 closes opening 52 air coming from the blower 27 is prevented from reaching tower 1b, whereas when smaller shutter 54 is moved away from opening 57 pipe 4 of tower 1b is set in communication with the atmosphere. This results in a counter current air flow being generated in tower 1b which is in communication with manifold 34, such counter current flow being issued from opening 57. As the air from the manifold 34 has been processed in the towers 1a, 1b and 1c, such air is dry, and thus it is suitable for regenerating tower 1b more effectively. Again regeneration phase occurs as described with reference to FIG. 4.

As will be noted, compared with the solutions known in the art, the present invention proposes a very simple circuit layout while using modular components. If desired, dehumidifiers can be manufactured with any desired number of towers in order to meet various flow rate requirements.

With a number of towers higher than three, regeneration occurs in rotation, in a very short time and with the great advantage that once heating is terminated there is no need to cool down the tower. As a matter of fact, once heating is terminated, the air coming from the just regenerated tower can be immediately used in a processing phase, thus obtaining a substantial energy saving owing to the recovery of already accumulated heat. Given that the regeneration temperature is about 300° C. the amount of recovered heat is significant. Moreover, the time required to conduct a regeneration cycle is reduced and constant electrical absorption and efficiency are obtained.

There is then the possibility of:
regenerating more than one tower at a time even in response to one saturation control signal,
incorporating valve 45 in the sieve towers, thus further reducing dimensions and assembly costs,
isolating one or more towers from the dehumidifier and locate them in the vicinity of the treatment hoppers or incorporate them into the treatment hoppers so as to reduce load losses, heat dispersion and costs.

The invention described above is susceptible to numerous modifications and variations within the protection scope as defined by the claims.

The invention claimed is:

1. A dehumidification apparatus comprising an outer tubular container closed at its ends, a first and a second transverse grid elements located inside said tubular container, one grid element being spaced from the other and from a respective adjacent end of said tubular container and delimiting a receiving space therewith, a mass of molecular sieves located in said receiving space, heating elements in said tubular container, and first and second openings for communication of the interior of said container with the outside, an inner tubular jacket member extending from at least said first grid element for a distance greater than that between said first and said second grid elements, thereby shaping said receiving space for said sieves as an annular gap and providing a projecting section extending from said second grid element, and an annular partition member between said outer container and said inner jacket member at said projecting section of said inner jacket member, thereby delimiting an annular manifold space with said second grid element communicating with the outside through said first opening, and an end space adjacent to said second end of said external container communicating with the interior of said inner jacket member and with the outside through said second opening.

2. An apparatus according to claim 1, wherein said first and said second openings are located at the same end of said outer container.

3. An apparatus according to claim 1, wherein said second end of said outer container includes a cap member suitable for being fixed thereto through said annular partition member.

4. An apparatus according to claim 3, wherein said annular partition member includes at least one annular plate-shaped flange with an inner and an outer rim, an annular seat at the said inner rim, at least one sealing means located in said annular seat to ensure tight sealing between said partition member and said inner jacket member, sealing means at said outer rim of said at least one annular plate-shaped flange, and holding means between said outer container and said cap member.

5. An apparatus according to claim 4, wherein said outer container has a peripheral rim and said cap member has a securing flange and said holding means comprises a surrounding clamping member, thereby tightening and sealing together said securing flange, said sealing means, and said rim of said outer container.

6. An apparatus according to claim 5, wherein said clamping member is V-shaped in cross-section and acts throughout its circumferential length.

7. An apparatus according to claim 4, comprising a first flange member having an inner rim flared in one direction, an annular plate-shaped counter-flange member having an inner rim flared in a direction opposite to that of said flange member, thereby delimiting therewith, in use, an annular seat facing said internal jacket member for receiving said sealing means.

8. An apparatus according to claim 7, wherein said sealing means includes at least one silicon gasket forced onto said outer rim of said flange member.

9. An apparatus according to claim 1, wherein said heating means is located inside said tubular internal jacket member.

10. An apparatus according to claim 9, wherein said heating means includes at least one electrical resistor.

11. An apparatus according to claim 10, wherein said at least one electrical resistor is controlled by at least one temperature sensor located at said first end of the said outer container.

12. An apparatus according to claim 1, wherein at least one of said grid elements is movably mounted between said outer container and said inner jacket member, and resiliently loaded by resilient loading means.

13. An apparatus according to claim 1, wherein said outer container and said inner jacket member are co-axially arranged with respect to one another.

14. A dehumidification plant for granular material including at least one molecular-sieve dehumidification apparatus as claimed in claim 1 and at least one treatment container for said granular material having one end air outlet communicating with an intake of at least one blower means for circulating air and its other end air intake communicating with a dehumidified air outlet of said at least one molecular-sieve dehumidification apparatus, and at least one shunt valve means between delivery of said at least one blower means and said at least one dehumidification apparatus.

15. A plant according to claim 14, wherein said end air intake communicates with a collection duct in communication with a dehumidified air outlet of two of said molecular sieve dehumidification apparatuses.

16. A plant according to claim 15, comprising two dehumidification apparatuses and wherein said shunt valve means is a four way flow direction reversing slide valve fed by a delivery duct of said blower means and designed to control the flow through two ducts each communicating with a respective dehumidification apparatus, and a releasing duct discharging into the atmosphere via a calibrated throttling.

17. A plant according to claim 16, wherein said throttling (32*a*) is adjustable.

18. A plant according to claim 16, comprising actuator means controlling said slide valve.

19. A plant according to claim 14, comprising a plurality of dehumidification apparatuses and wherein said at least one two-position shunt valve includes a main valve body delimiting a first and a second inner chambers separated by an inner partition member, two openings in said first chamber, an opening in said partition member for enabling communication between said first and said second chambers, a first shutter member designed to control said opening, a second shutter member located away from said opening, a rod member arranged to control said first and second shutters, an actuator means designed to actuate said rod member, and a smaller and larger openings in said second chamber controlled by said second shutter.

20. A plant according to claim 19, wherein said second chamber communicates, in use, with said delivery of said at least one blower means, said larger opening communicates with said duct of a respective dehumidification apparatus, and said smaller opening constitutes an exhaust to the atmosphere, whereby in a first position each valve places delivery of said at least one blower means in communication with said intake duct of a respective molecular sieve dehumidification apparatus, whereas in a second position each valve shut off said communication and set said intake duct into communication with the atmosphere.

21. A plant according to claim 19, wherein said plurality of dehumidification apparatuses are mounted in parallel between said delivery of said at least one blower means in communication with said intake duct of each dehumidification apparatus through a respective two-way valve and a manifold duct in communication with outlet ducts of each dehumidification apparatus and with at least one treatment silo container.

22. A plant according to claim 14, comprising at least one filtering unit upstream of each blower means.

23. A plant according to claim 22, wherein each molecular sieve dehumidification apparatus comprises sensor means designed to detect saturation level of said molecular sieves, thereby generating control signals to start a regeneration cycle for said saturated molecular sieves.

24. A plant according to claim 23, wherein hot and humid regeneration air in each dehumidification apparatus is used to preheat air taken in by a dehumidification apparatus during a dehumidification process.

25. A plant according to claim 22, wherein said at least one blower means is of a variable flow rate type.

* * * * *